June 10, 1969  J. G. JELINEK ET AL  3,448,986

GASKET AND JOINT FOR CYLINDER HEADS

Filed Aug. 4, 1966

INVENTORS
JERRY G. JELINEK
BY HARREL M. DIAL

John N. Wolfram
ATTORNEY

United States Patent Office 3,448,986
Patented June 10, 1969

3,448,986
GASKET AND JOINT FOR CYLINDER HEADS
Jerry G. Jelinek, Whittier, and Harrell M. Dial, Los Angeles, Calif., assignors to Parker-Hannifin Corporation, Cleveland, Ohio, a corporation of Ohio
Filed Aug. 4, 1966, Ser. No. 570,236
Int. Cl. F16j 15/08, 15/10
U.S. Cl. 277—180                                    19 Claims

ABSTRACT OF THE DISCLOSURE

A gasket and joint for the cylinder head of an internal combustion engine wherein the cylinder head and cylinder block have coolant passages and have flat surfaces surrounding the cylinder bore, one of the parts having a counterbore surrounding the coolant passage and the other part having its flat surface extending opposite the counterbore, the gasket comprising a thin metal sheet having faces sealingly engaging the head and block surfaces and having a cup shaped portion with an elastomeric packing ring attached thereto that sealingly engages the counterbore bottom and the opposed flat surface.

---

In the past it has been the practice either to use gaskets of metal or a composition type material such as asbestos to seal both the combustion chamber and coolant passages, or to use a metal gasket to seal the combustion chamber and a series of separate elastomeric rings to seal the coolant passages. The former types are not satisfactory because the limited deformation provided by such seals makes it difficult to effectively seal the combustion chamber and the coolant passages through the cylinder block without making the sealing surfaces of the head and cylinder block flat and true to a high degree of accuracy. The latter type is also unsatisfactory because of the necessity of handling a number of separate pieces.

An object of the present invention is to overcome these difficulties by providing a unitary combination metal and elastomeric sealing gasket in which a metal member is used for sealing in the high temperature area of the combustion chamber and elastomeric rings permanently attached to the metal member are used for sealing in the lower temperature areas around the coolant passages. Attachment of the packing rings to the metal plate is accomplished by a mechanical connection between the two and also by providing webs on the rings that are adhered to opposite faces of the plate.

To provide a sufficient mass of elastomeric material to insure sufficient deformation into sealing engagement with sealing surfaces about the coolant passages, the cylinder block (or the cylinder head if so preferred) is counterbored about the coolant passage therein for receiving a substantial portion of the elastomeric rings. The walls of the counterbore serve as a backup for the rings when the latter are deformed by pressure of coolant fluid. To insure an effective seal for the combustion chamber, the metal portion of the gasket adjacent the combustion chamber has a thin coating of copper or other soft material that readily deforms to make a fluid-tight joint with opposed flat faces of the head and cylinder block. The invention therefore embraces not only the gasket itself, but also the complete joint.

Figure 1:
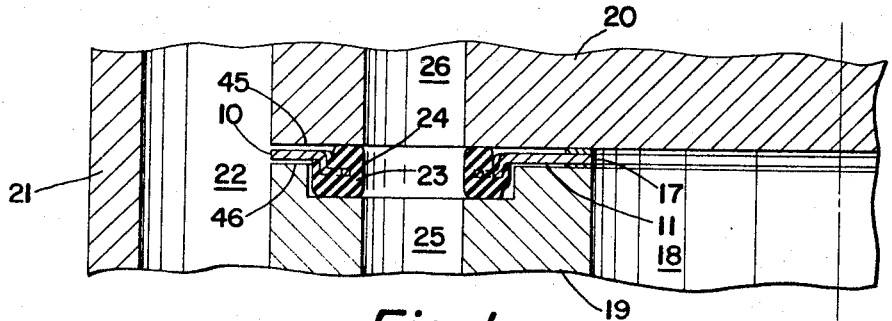
Figure 2:
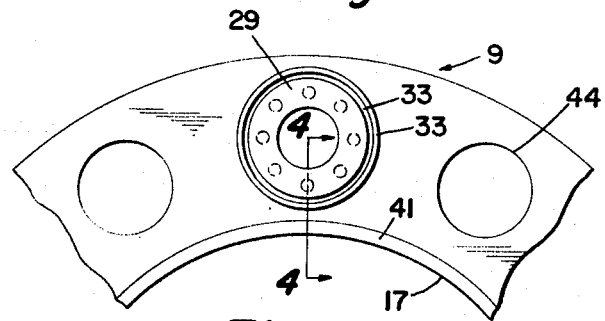
Figure 3:
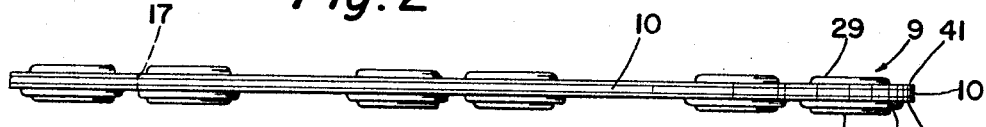
Figure 4:
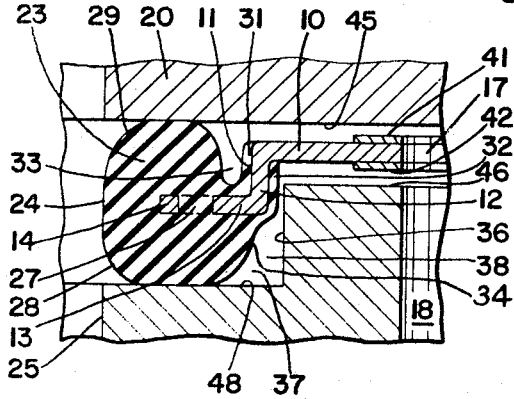

Other objects of the invention, and the manner of accomplishing the same, will be apparent from the following detailed description and from the drawings in which:

FIG. 1 is a fragmentary cross-section view of the gasketed joint between the cylinder block and head of an internal combustion engine, FIG. 2 is a fragmentary plan view of the gasket in smaller seals than FIG. 1, FIG. 3 is a side view of the gasket in still smaller seals, FIG. 4 is a fragmentary enlarged section view of the gasket along the lines 4—4 of FIG. 2 and showing the parts in loose assembled position.

Figure 5:
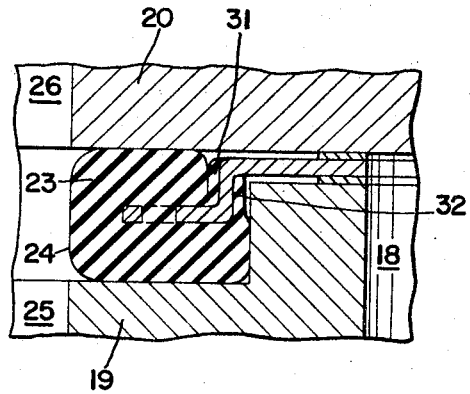

FIG. 5 is a view like FIG. 4 but showing the parts in tightly assembled position.

The gasket is generally designated 9 and comprises a metallic plate 10 of ring-like or other annular configuration that is generally flat but which has a series of cup-shaped depressions 11 stamped therein. These depressions have a cylindrical wall portion 12 and a laterally extending bottom wall portion 13, with the latter having an opening 14 therethrough. There is a plurality of these cup-shaped depressions 11, one for each coolant passage to be sealed, and the depressions 11 surround another and larger opening 17 through plate 10 that is adapted to register with the combustion chamber 18 formed by cylinder block 19 and cylinder head 20.

A sleeve 21 surrounds the head 20 and cylinder block 19 and is spaced therefrom to provide an annular chamber 22 that alternately serves as an inlet passage for introducing air under pressure into combustion chamber 18 by suitable passages that are not shown, and as an exhaust passage for carrying away exhaust gases from combustion chamber 18.

Attached to the bottom wall portion 13 of each cup-shaped depression 11 is an annular elastomeric packing ring 23 that has an opening 24 therethrough that is adapted for registration with passages 25, 26 through cylinder block 19 and cylinder head 20. Each bottom wall portion 13 has a series of small holes 27 spaced about openings 14. Packing ring 23 is preferably molded into place on wall portion 13 so that the rubberlike material flows through opening 27 during the molding process to form a means for mechanically anchoring the packing to plate 12. Alternately, holes 27 may be eliminated and the packing ring cemented or bonded to bottom wall portion 13. In either event bottom wall portion 13 extends to about the midpoint between the inner and outer diameters of the main body portion of packing ring 23 and is located about halfway between the upper and lower end faces thereof. The end faces of the packing ring are well rounded, as indicated at 28, 29.

Extending from the main body of packing ring 23, and integral therewith, are thin webs 31, 32 of elastomeric material that follow the contours of bottom wall 13 and cylindrical wall 12 and that are cemented or bonded thereto to supplement the attachment of packing ring 23 to plate 10 so as to make such attachment more secure.

At its upper end there is a void or space 33 between the main body of packing 23 and web 31, this space being sufficient to receive material of the upper end of packing 23 when the same is displaced or deformed when the gasket is clamped between the cylinder head and cylinder block.

At its lower end, the main body of packing 23 overlies almost the entire flat underside of bottom wall portion 13 for fully supporting the same when the gasket is clamped in place. The outer wall 34 of this end of the packing is tapered as shown and when in place is spaced from the adjacent cylindrical wall 36 of counterbore 37 in cylinder block 19 to provide an initial void space 38 when the parts are loosely assembled that is of sufficient volume to receive displaced elastomeric material when the gasket is clamped tightly in place.

The inner margin of plate 10 adjacent opening 17 has formed on each side thereof raised portions 41, 42 that completely surround opening 17. These raised portions are preferably formed by applying a layer of copper or other soft metal and preferably to a thickness of about .002 inch.

Plate 10 also has formed therein a series of openings 44 through which bolts may pass for bolting cylinder head 20 to cylinder block 19.

In its free state or unassembled condition, the upper end of packing ring 23 extends axially beyond the upper surface of raised portion 41. When the gasket is in place on cylinder block 19, with each packing ring 23 within its respective counterbore 37, and cylinder head 20 loosely in place, packing ring 23 is undeformed between flat face 45 and counterbore bottom wall 48, as illustrated in FIG. 4. At this time raised portions 41, 42 will be out of contact with flat face 45 and flat face 46, respectively.

Upon drawing down of head 20 toward block 19 by means of bolts (not shown), the upper and lower ends of each packing ring 23 will be deformed into tight sealing contact with respective faces 45 and walls 48 and will be deformed thereby so as to substantially fill voids 33 and 38, as shown in FIG. 5. Also, faces 45 and walls 48 will engage in sealing contact with raised portions 41, 42.

Meanwhile, plate 10 will remain out of contact with the cylinder head and cylinder block, whereby there will be a minimum of heat transferred from these members to gasket plate 10, and hence to the central portion of packing member 23. Moreover, the small clearance which remains between surface 45, 46 and plate 10 (see FIG. 1) is sufficiently small to substantially impair exposure of elastomeric packing ring 23 to hot exhaust gas in chamber 22 during the exhaust cycle whereby packing ring 23 is protected against overheating. Minimizing of the heat build-up in packing 23 in this manner prolongs the useful life thereof.

Also, substantial filling of voids 33 and 37 permits backing up of the packing by the cylindrical wall 12 and counterbore wall 36 to prevent undue outward expansion of packing 23 by pressure of coolant fluid on the inside diameter thereof.

We claim:

1. A gasket comprising a plate of rigid material of substantially uniform thickness, said plate having an exposed upper transverse face and having a cup shaped depression therein comprising a portion extending axially downward from said upper face and a transverse portion at the lower end of said axially extending portion, an opening in said transverse portion, an annular elastomeric packing member comprising a main body attached to the transverse portion at said opening, said member extending initially axially beyond said face and located on both sides of said transvesre portion.

2. The gasket of claim 1 in which said plate is attached to the packing member centrally between the ends thereof.

3. The gasket of claim 1 in which said plate has an exposed flat face opposed to the transverse face and has another opening and each of said faces has a raised portion surrounding said another opening.

4. The gasket of claim 1 in which said packing member includes a web of elastomeric material against one side of said axially extending portion.

5. The gasket of claim 1 in which said main body is spaced from said axially extending portion.

6. The gasket of claim 3 in which said raised portions comprise a layer of soft metal.

7. The gasket of claim 3 in which said raised portions extend only part way between said another opening and the cup-shaped depression.

8. The gasket of claim 4 in which said packing member includes another web of elastomeric material against the other side of said axially extending portion.

9. A fluid tight joint comprising a first body member having first and second openings therein and having a first flat face surrounding the first opening, said face having counterbore therein surrounding the second opening, a second body member having an opening registering with said second opening and having a second flat face extending between the first and second openings and surrounding each of said openings so as to overlie said counterbore, a plate of rigid material clamped between said faces and surrounding said first opening, said plate having a cup-shaped depression therein extending into said counterbore and having a third opening therein in register with said second opening to form a passageway in said body members, an annular elastomeric packing member attached to said cup-shaped depression and surrounding said second opening, said packing member extending into contact with said second flat face and the bottom wall of said counterbore to seal said passageway.

10. The joint of claim 9 in which said plate has raised portions on each end face thereof and surrounding said first opening, the remainder of said plate being out of contact with said body members.

11. A joint comprising a first member having a cavity and a first passage for fluid spaced from said cavity, a second member having a wall for closing said cavity and having a second passage aligned with said first passage, said members having flat faces extending from the cavity to said passages and surrounding the latter, one of said flat faces having a counterbore surrounding the passage in said one member, said counterbore having a cylindrical wall and a transverse bottom wall, a gasket between said flat faces, said gasket comprising a plate of rigid material having opposed flat faces and having a cup-shaped depression therein within said counterbore and having a loose guide fit therein, an annular elastomeric packing member attached to the cup-shaped depression and having its ends engaged in sealing contact with said flat faces.

12. The joint of claim 11 in which said packing member includes a main body portion extending axially above and below the bottom wall portion of the cup-shaped depression.

13. The joint of claim 11 in which said plate has a raised portion on each side thereof adjacent to and surrounding said cavity and in sealing engagement with said flat faces, the remaining portion of said plate being out of contact with said flat faces.

14. The joint of claim 11 in which said packing member includes a main body portion and a thin web of elastomeric material on the outside wall of said cup-shaped depression and having a close guiding fit within said counterbore and being attached to said main body portion.

15. The joint of claim 12 in which the upper part of said main body portion is spaced from the side wall of said cup-shaped depression and the lower part of said main body portion is initially spaced from said counterbore cylindrical wall to provide spaces into which said main body portion is deformed when the joint is tight.

16. The joint of claim 11 in which said packing member includes a main body portion and a thin web of elastomeric material connected to the main body portion and extending along the inside wall of said cup-shaped depression and initially not extending upwardly beyond the upper face of said plate.

17. A fluid tight joint comprising first and second body members, one of the members having an opening therein to be sealed, said first body member having a recess exposed to the opening, said recess having a bottom wall and a side wall, a plate of rigid material having a portion clamped between said body members and having a laterally extending portion axially offset from the clamped portion and extending into said recess, an elastomeric packing member attached to said laterally extending portion and in sealing contact with said second body member and said bottom wall.

18. The joint of claim 17 in which said opening is in the first member and is surrounded by the recess.

19. The joint of claim 17 in which said laterally extending portion is axially spaced from said bottom wall and said packing member has portions between the laterally extending portion and said bottom wall and between said laterally extending portion and said second member.

References Cited

UNITED STATES PATENTS

| | | | |
|---|---|---|---|
| 2,532,891 | 12/1950 | Chupp | 277—211 X |
| 2,679,241 | 5/1954 | Dickson | 123—193 |
| 3,093,581 | 6/1963 | Pall et al. | 277—234 X |
| 3,191,950 | 6/1965 | Hiltner | 277—211 X |
| 3,195,906 | 7/1965 | Moyers | 277—211 X |
| 3,215,442 | 11/1965 | Papenguth | 277—211 X |
| 3,285,615 | 11/1966 | Trbovich | 277—235 |
| 3,340,774 | 9/1967 | Brenneke | 92—171 |

LAVERNE D. GEIGER, *Primary Examiner.*

JEFFREY S. MEDNICK, *Assistant Examiner.*

U.S. Cl. X.R.

92—169; 277—211, 212, 235; 285—349